US012684532B2

(12) United States Patent　　　　　　(10) Patent No.: US 12,684,532 B2
Ceendhralu et al.　　　　　　　　　　　(45) Date of Patent: Jul. 14, 2026

(54) METHOD AND SYSTEM FOR SHARING RADIO FREQUENCY RESOURCE IN multi-SIM DEVICE

(71) Applicant: SAMSUNG ELECTRONICS CO., LTD., Suwon-si (KR)

(72) Inventors: Umasankar Baskar Ceendhralu, Bengaluru (KR); Mohanraja Balasubramaniam, Bengaluru (KR); Thejeswara Reddy Pocha, Bengaluru (KR); Prasad Basavaraj Dandra, Bengaluru (KR); Goutham Ponnamreddy, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 488 days.

(21) Appl. No.: 18/119,667

(22) Filed: Mar. 9, 2023

(65) Prior Publication Data

US 2023/0292287 A1　　　Sep. 14, 2023

(30) Foreign Application Priority Data

Mar. 11, 2022　(IN) .............................. 202241013455

(51) Int. Cl.
　H04B 17/318　　　(2015.01)
　H04L 65/1016　　　(2022.01)
　　　　　(Continued)
(52) U.S. Cl.
　CPC ......... H04W 68/02 (2013.01); H04L 65/1016 (2013.01); H04W 76/28 (2018.02)
(58) Field of Classification Search
　CPC .... H04W 68/02; H04W 76/28; H04L 65/1016
　　　　　(Continued)

(56) References Cited

U.S. PATENT DOCUMENTS 9,544,042 B2　1/2017　Li et al.
9,872,239 B2 *　1/2018　Lee ...................... H04W 76/28
　　　　　(Continued)

FOREIGN PATENT DOCUMENTS

CN　　114128354 A　　3/2022

OTHER PUBLICATIONS

Dash, D., B., et al., "Adaptive DRX Mechanism To Improve Energy Effciency And To Reduce Page Delay For VoWiFi Devices" 2022 IEEE Women in Technology Conference (WINTECHCON) DOI: 10.1109/WINTECHCON55229.2022.9832299 (2022), 6 pages.

(Continued)

*Primary Examiner* — Sithu Ko
(74) *Attorney, Agent, or Firm* — Sughrue Mion, PLLC

(57)　　　　　ABSTRACT

A method for sharing a radio frequency (RF) resource among multi-subscriber identification module (SIM) stacks in a multi-SIM device, includes: receiving two paging requests from the multi-SIM stacks for performing communication with a network entity via the RF resource; transmitting the two paging received requests to the network entity via the RF resource; detecting a page sharing conflict between the two paging requests of the multi-SIM stacks; determining, based on the detection of the page sharing conflict, a connection status of a connection between each stack of the multi-SIM stacks and the network entity. The connection status indicates a communication medium via which each stack of the multi-SIM stacks is connected with the network entity. The method includes prioritizing, based on the determined connection status, a grant of the RF resource to a stack of the multi-SIM stacks whose connection status indicates a cellular connection as the communication medium.

12 Claims, 6 Drawing Sheets

(51) Int. Cl.
    *H04W 28/04*     (2009.01)
    *H04W 68/02*     (2009.01)
    *H04W 76/28*     (2018.01)

(58) Field of Classification Search
    USPC ........................................................ 370/329
    See application file for complete search history.

(56)                References Cited

U.S. PATENT DOCUMENTS

| | | | |
|---|---|---|---|
| 11,252,787 B2 * | 2/2022 | Kavuri | H04W 60/00 |
| 12,439,373 B2 * | 10/2025 | Kumar | H04W 8/183 |
| 2013/0316676 A1 | 11/2013 | Nousiainen et al. | |
| 2016/0174187 A1 | 6/2016 | Gopala Krishnan et al. | |
| 2018/0115978 A1 * | 4/2018 | Shi | H04W 72/56 |
| 2018/0220329 A1 * | 8/2018 | Arumugam | H04L 65/1073 |
| 2018/0255450 A1 | 9/2018 | Kumar et al. | |
| 2020/0037281 A1 * | 1/2020 | Lee | H04L 65/1073 |
| 2021/0014822 A1 * | 1/2021 | Gurumoorthy | H04W 68/02 |
| 2021/0029773 A1 | 1/2021 | Majumder et al. | |
| 2021/0185745 A1 * | 6/2021 | Chinnakkannu | H04W 76/14 |
| 2022/0240213 A1 | 7/2022 | Ly et al. | |
| 2023/0189212 A1 * | 6/2023 | Chen | H04W 68/12 |
| | | | 455/458 |

OTHER PUBLICATIONS

3GPP TS 23.501 V16.6.0 (Oct. 2020), 450 pages.
3GPP TS 24.501 V17.7.1 (Jul. 2022), 981 pages.
3GPP TS 38.331 V16.7.0 (Jan. 2022), 950 pages.

* cited by examiner

200

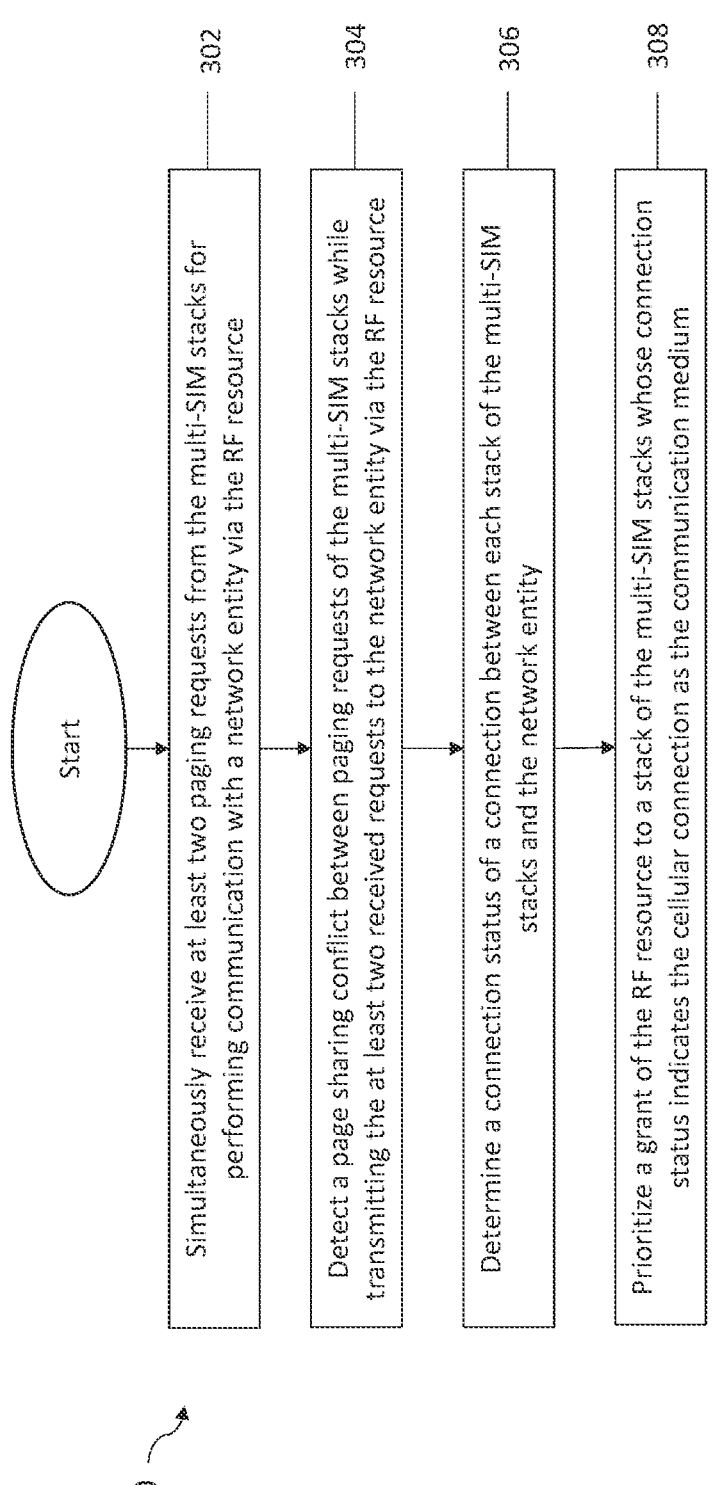

Start

Simultaneously receive at least two paging requests from the multi-SIM stacks for performing communication with a network entity via the RF resource — 302

Detect a page sharing conflict between paging requests of the multi-SIM stacks while transmitting the at least two received requests to the network entity via the RF resource — 304

Determine a connection status of a connection between each stack of the multi-SIM stacks and the network entity — 306

Prioritize a grant of the RF resource to a stack of the multi-SIM stacks whose connection status indicates the cellular connection as the communication medium — 308

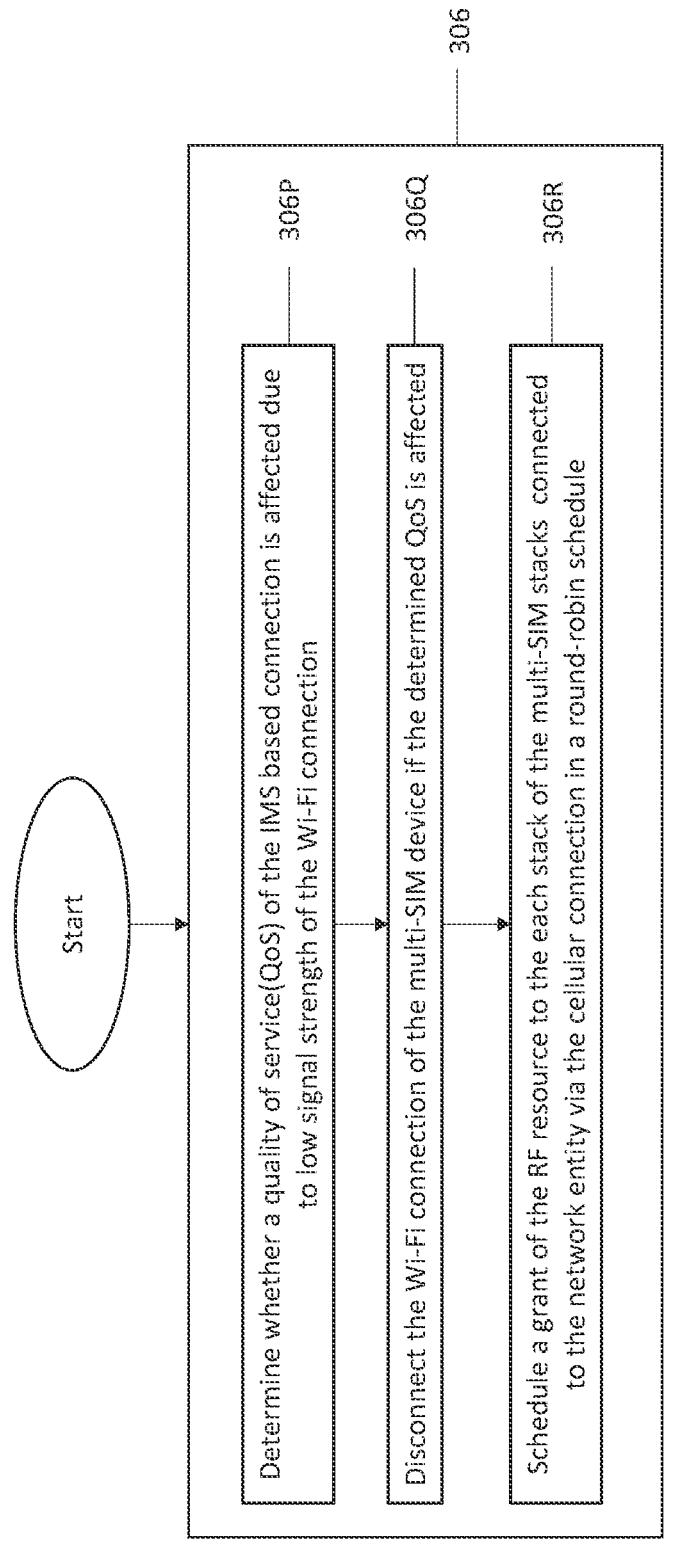

Start

306

Determine whether a quality of service(QoS) of the IMS based connection is affected due to low signal strength of the Wi-Fi connection
306P Disconnect the Wi-Fi connection of the multi-SIM device if the determined QoS is affected
306Q Schedule a grant of the RF resource to the each stack of the multi-SIM stacks connected to the network entity via the cellular connection in a round-robin schedule
306R

FIG. 5

METHOD AND SYSTEM FOR SHARING RADIO FREQUENCY RESOURCE IN multi-SIM DEVICE

CROSS-REFERENCE TO RELATED APPLICATIONS

This application is based on and claims priority to Indian Patent Application No. 202241013455, filed on Mar. 11, 2022, in the Indian Intellectual Property Office, the disclosure of which is incorporated by reference herein its entirety.

BACKGROUND

1. Field

The disclosure generally relates to a field of wireless communication and more particularly relates to a method and system for sharing a radio frequency (RF) resource among multi-subscriber identification module (SIM) stacks in a multi-SIM device.

2. Description of Related Art

Traditionally, mobile devices have utilized a single SIM card, which is associated with a single mobile subscription and service provider. However, with the increasing demand for more flexible and efficient communication solutions, multi-SIM devices have become increasingly popular. Each of the multi-SIM devices can hold multiple SIM cards (i.e., multi stacks or multi-SIMs) and allows users to switch between them easily.

In general, the multi-SIM device uses a hardware switch to select one of an active SIMs. This allows a user to switch between mobile network subscriptions quickly and easily, without physically removing and replacing SIM cards. The multi-SIM device may also perform various types of communications such as voice communication, Peer to Peer (P2P) communication using the internet, text-based communication using a short message service (SMS), Voice over Long Term Evolution (VoLTE)-based communication, voice over 5G, etc.

The multi-SIM device includes a single radio frequency (RF) resource for communicating with a network entity. The single RF resource of the multi-SIM device receives paging requests from at least one SIM among the multi-SIMs for communicating with the network entity. Upon receiving the paging request, the single RF resource of the multi-SIM device establishes a communication link (or a channel) with the network entity for providing services to the user of the multi-SIM device.

Further, the single RF resource of the multi-SIM device may also receive paging requests from more than one SIM among the multi-SIMs, simultaneously, for communicating with the network entity. In such a case, a paging collision scenario is commenced in the single RF resource. In this scenario, the single RF resource responds to the paging request from one SIM among multi-SIMs. On contrary, the other SIM of the multi-SIMs suffers a delay in paging response or a failure of the paging response altogether. Thus, the multi-SIM device is unable to receive multiple mobile terminated (MT) services simultaneously due to the presence of the single RF resource. The MT service may relate to any service sent from a service provider or the network entity to the multi-SIM device. Thus, sharing the single RF resource among the multi-SIMs is a challenging task in the multi-SIM device when the single RF resource receives paging requests from more than one SIM among the multi-SIMs simultaneously.

In an idle mode, the multi-SIM device listens to the paging request in a discontinuous reception (DRX) mode. Further, in a DRX mode, the multi-SIM device is activated intermittently to listen to any paging messages from a cellular network. Also, in the DRX mode, the multi-SIM device simultaneously listens to beacon signals from a wireless local area network (WLAN). In general, the DRX mode is a method for conserving a battery consumption of the multi-SIM device by intermittently waking up and turning into a low-power state mode in-between to reduce the battery consumption. However, the simultaneous listening from the cellular network and the WLAN cause additional power consumption for the multi-SIM device.

Thus, it would be advantageous to provide a method and a system that can overcome each of the problems discussed herein.

SUMMARY

This summary is provided to introduce a selection of embodiments, in a simplified format, that are further described in the detailed description of the disclosure. This summary is neither intended to identify key or essential features of the disclosure nor is it intended for determining the scope of the disclosure.

According to an aspect of the disclosure, a method for sharing a radio frequency (RF) resource among multi-subscriber identification module (SIM) stacks in a multi-SIM device, includes: simultaneously receiving two paging requests from the multi-SIM stacks for performing communication with a network entity via the RF resource; transmitting the two paging received requests to the network entity via the RF resource; detecting a page sharing conflict between the two paging requests of the multi-SIM stacks; determining, based on the detection of the page sharing conflict, a connection status of a connection between each stack of the multi-SIM stacks and the network entity. The connection status indicates a communication medium via which each stack of the multi-SIM stacks is connected with the network entity. The method includes prioritizing, based on the determined connection status, a grant of the RF resource to a stack of the multi-SIM stacks whose connection status indicates a cellular connection as the communication medium.

According to another aspect of the disclosure, a system for sharing a RF resource among multi-SIM stacks in a multi-SIM device, includes: a radio frequency integrated circuit (RFIC) for simultaneously receiving, at the same time or substantially same time, paging requests from the multi-SIM stacks for performing communication with a network entity via the RF resource; and a processor communicatively coupled with the RFIC and one or more memory units. The processor is configured to: transmitting two paging requests received by the RFIC to the network entity via the RF resource; detect a page sharing conflict between paging requests of the multi-SIM stacks; determine, based on the detection of the page sharing conflict, a connection status of a connection between each stack of the multi-SIM stacks and the network entity. The connection status indicates a communication medium via which each stack of the multi-SIM stacks is connected with the network entity. The processor is also configured to prioritize, based on the determined connection status, a grant of the RF resource to a stack of the multi-SIM stacks whose connection status indicates a cellular connection as the communication medium.

To further clarify the advantages and features of the disclosure, a more particular description of the disclosure will be rendered by reference to specific embodiments thereof, which is illustrated in the appended drawing. It is appreciated that these drawings depict only typical embodiments of the disclosure and are therefore not to be considered limiting its scope. The disclosure will be described and explained with additional specificity and detail with the accompanying drawings.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein:

FIG. 3 illustrates a flow chart of a method for sharing the RF resource among the multi-SIM stacks, in accordance with an embodiment of the present disclosure;

FIG. 5 illustrates a second flow chart of subsequent operations of operation 306 of FIG. 3, in accordance with an embodiment of the present disclosure.

Figure 1:
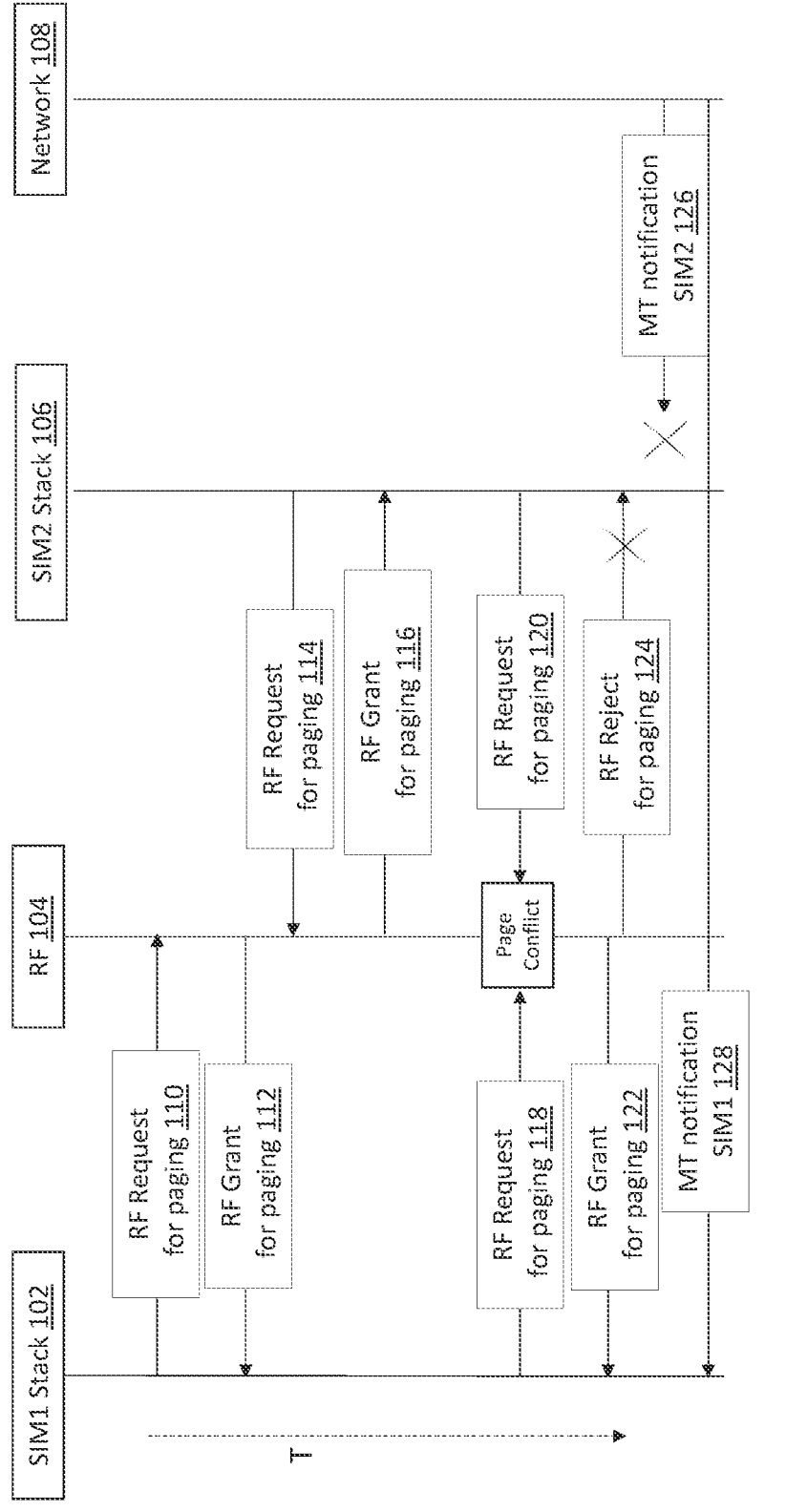
FIG. 1 illustrates an exemplary line diagram of the subsequent operations in a request for paging in a multi-SIM device, in accordance with existing art.

Further, skilled artisans will appreciate those elements in the drawings are illustrated for simplicity and may not have necessarily been drawn to scale. For example, the flow charts illustrate the method in terms of the most prominent operations involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION OF EMBODIMENTS

For the purpose of promoting an understanding of the principles of the disclosure, reference will now be made to the various embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

The term "some" or "one or more" as used herein is defined as "one", "more than one", or "all." Accordingly, the terms "more than one," "one or more" or "all" would all fall under the definition of "some" or "one or more". The term "an embodiment", "another embodiment", "some embodiments", or "in one or more embodiments" may refer to one embodiment or several embodiments, or all embodiments. Accordingly, the term "some embodiments" is defined as meaning "one embodiment, or more than one embodiment, or all embodiments". The term "in an exemplary embodiment" refers to an example with respect to the embodiment of the present disclosure.

The terminology and structure employed herein are for describing, teaching, and illuminating some embodiments and their specific features and elements and do not limit, restrict, or reduce the spirit and scope of the claims or their equivalents. The phrase "exemplary" may refer to an example.

More specifically, any terms used herein such as but not limited to "includes," "comprises," "has," "include", "comprising", "have", and grammatical variants thereof do not specify an exact limitation or restriction and certainly do not exclude the possible addition of one or more features or elements, unless otherwise stated, and must not be taken to exclude the possible removal of one or more of the listed features and elements, unless otherwise stated with the limiting language "must comprise" or "needs to include".

Whether or not a certain feature or element was limited to being used only once, either way, it may still be referred to as "one or more features", "one or more elements", "at least one feature", or "at least one element". Furthermore, the use of the terms "one or more" or "at least one" feature or element does not preclude there being none of that feature or element unless otherwise specified by limiting language such as "there needs to be one or more" or "one or more element is required."

Unless otherwise defined, all terms, and especially any technical and/or scientific terms, used herein may be taken to have the same meaning as commonly understood by one having ordinary skill in the art.

The term voice-over wireless fidelity (VoWiFi) is an alternate data-driven wireless technique allowing the user to make calls, SMS, multimedia messaging service (MMS), or receive emergency calls via a Wi-Fi network. The VoWiFi utilizes IP multimedia subsystem (IMS) technology to provide a packet voice service that is delivered over IP via the Wi-Fi network. The multi-SIM device may include a Wi-Fi modem/antenna to connect with the Wi-Fi network to enable a stack to access VoWiFi technique over the Wi-Fi network.

Embodiments of the present disclosure will be described below in detail with reference to the accompanying drawings.

An exemplary line diagram of the subsequent operations in a request for paging in a multi-SIM device is shown in FIG. 1 of the drawings, in accordance with the related art. FIG. 1 illustrates subsequent communications between a SIM1 stack 102, a SIM2 stack 106, an RF resource 104, and a cellular network 108.

The sequence of operations is shown in an increasing timestamp, T.

In operation 110, SIM1 stack 102 transmits a paging request to the RF resource 104.

In operation 112, based on the paging request, SIM1 stack 102 receives a grant of the RF resource 104 for communicating with a network entity.

Similarly, in operations 114, and 116, the RF resource 104 is granted to SIM2 stack 106 based on the paging request from SIM2 stack 106.

However, in operation 118 and operation 120, SIM1 stack 102 and SIM2 stack 106 simultaneously or substantially at the same time transmit the paging requests to the RF resource 104. Thus, a page conflict has occurred in the RF resource 104 due to receiving multiple requests at the same time from the plurality of SIMs. Based on the priority of the paging requests, SIM1 stack 102 receives the grant of the RF resource 104 for communicating with the network entity.

In operation 124, on contrary, SIM2 stack 106 receives a rejection of the RF resource 104 as the RF resource 104 facilitates communication for SIM1 stack 102.

In operation 128, SIM1 stack 102 receives a MT notification from the network 108 via the RF resource 104.

In operation 126, SIM2 stack 106 fails to receive any MT notification from the network 108 due to the unavailability of the RF resource 104.

In a non-limiting example, the priority of the paging requests may be determined based on the type of requests received from the plurality of SIMs. That is, the priority of the paging requests of a voice call is always greater than the request for internet surfing. Further, the paging requests for sending or receiving email communication have a higher priority than a paging request for social media activity. Thus, based on the priority of the paging requests, the RF resource 104 is granted to the SIM requesting for the higher priority page request.

Figure 2:
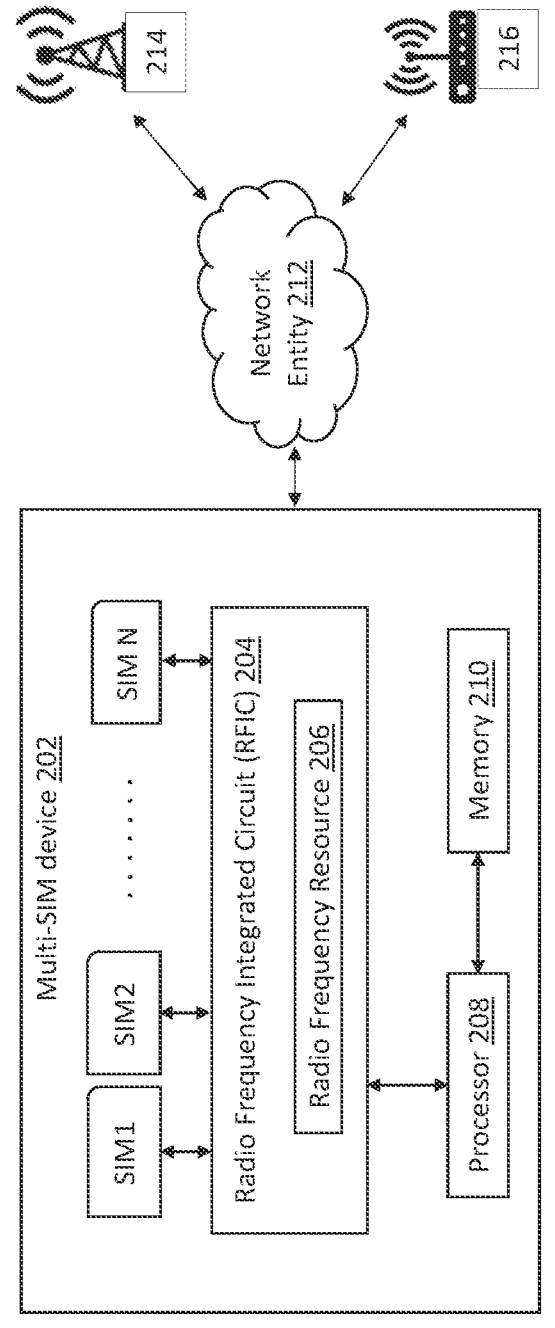
FIG. 2 illustrates a schematic block diagram of a system for sharing a radio frequency (RF) resource among multi-subscriber identification module (SIM) stacks in the multi-SIM device, in accordance with an embodiment of the present disclosure.

FIG. 2 illustrates a schematic block diagram of a system 200 for sharing an RF resource among multi-SIM stacks in a multi-SIM device 202, in accordance with an embodiment of the present disclosure. In an embodiment, the system 200 includes the multi-SIM device 202 configured with a plurality of SIMs (SIM1, SIM2, . . . , SIM N), a radio frequency integrated circuit (RFIC) 204, a processor 208, and a memory 210. The RFIC 204 includes a single RF resource 206 for sharing between the plurality of SIMs. The multi-SIM device 202 is configured to communicate with a base station 214 or a wireless fidelity (Wi-Fi) network 216 via a network entity 212. As an exemplary embodiment, the multi-SIM device 202 may correspond to, but not limited to, a smartphone, a mobile device, other mobile devices, a portable communication device, a laptop, a tablet, etc. having the plurality of SIMs for communicating with the base station 214 or the Wi-Fi network 216 via the network entity 212.

In an embodiment, each of the SIMs (for example, SIM1, SIM2, . . . , SIM N) is an integrated circuit that securely stores an international mobile subscriber identity (IMSI) number and a key related to the corresponding SIMs. The IMSI number and a key related to the IMSI uniquely identify the user using the corresponding SIMs.

Each of the SIMs, also known as a stack, may include a limited memory for storing contact details or messages. In another embodiment, the SIM may relate to an embedded SIM or eSIM. The eSIM is a programmable SIM card that is embedded directly into the multi-SIM device 202. The eSIM is more secure than the normal SIM as the eSIM is integrated within the multi-SIM device 202 itself and cannot be removed from the multi-SIM device 202. The eSIM can be activated instantly using scanning a quick response (QR) code corresponding to the service operator.

In yet another embodiment, the multi-SIM device 202 may include N numbers of SIM, such as SIM1, SIM2, . . . , SIM N, where N can be any positive integer number greater than or equal to two. In a non-limiting example, a dual-SIM UE may include two SIMs for establishing communication via the network entity 212. Further, a triple-SIM UE includes three SIMs for establishing communication via the network entity 212.

In an embodiment, the RFIC 204 is communicatively coupled with the plurality of SIMs for transmitting and receiving a plurality of communication signals. The RFIC 204 may be applied to an electrical integrated circuit operating in a frequency range suitable for wireless transmission. The RFIC 204 may be fabricated on a substrate. The substrate may be produced by complementary metal-oxide-semiconductor (CMOS) Technology, Silicon Germanium Technology, Gallium Arsenide Technology, etc. The substrate may support various modules, such as digital-to-analog converter, analog-to-digital converter, etc. For example, the RFIC 204 usually runs in the wireless frequency range of 3 kHz to 2.4 GHz (3,000 hertz to 2.4 billion hertz).

In an embodiment, the RFIC 204 includes the RF resource 206. The RF resource 206 may include a transceiver circuit for transmitting and receiving a plurality of communication signals. The transceiver circuit may include a receiver and a transmitter. The receiver may correspond to a receiving channel and the transmitter may correspond to a transmitting channel. The RF resource 206 may be configured to receive downlink signals from the network entity 212 via the receiving channel.

Further, the RF resource 206 may be configured to transmit uplink signals to the network entity 212 via the transmitting channel for transmitting the paging requests. In a non-limiting example, a dual sim dual standby (DSDS) device includes the single RF resource 206 for receiving and transmitting radio signals.

In another non-limiting example, the multi-SIM device 202 may include a plurality of RF resources based on the different network bands to which the multi-SIM device 202 may be connected. The multi-SIM device 202 may have the RF resource for the 3G network band and another RF resource for the 5G network band.

In an embodiment, the processor 208 may be operatively coupled to the RFIC 204 for processing, executing, or performing a plurality of operations. Further, the processor 208 is communicatively coupled to the memory 210. In an embodiment, the processor 208 may include at least one data processor for executing processes of the multi-SIM device 202. The processor 208 may include specialized processing units such as integrated system (bus) controllers, memory management control units, floating point units, graphics processing units, digital signal processing units, etc. In an embodiment, the processor 208 may include a central processing unit (CPU), a graphics processing unit (GPU), or both. The processor 208 may be one or more general processors, digital signal processors, application-specific integrated circuits, field-programmable gate arrays, servers, networks, digital circuits, analog circuits, combinations thereof, or other now-known or later developed devices for analyzing and processing data. The processor 208 may execute a software program, such as code generated manually (i.e., programmed) to perform the desired operation.

In an embodiment, the memory 210 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The memory 210 is communicatively coupled with the processor 208 to store bitstreams or processing instructions for completing the process. Further, the memory 210 may include an operating system for performing one or more tasks of the system 200, as performed by a generic operating system in the communications domain. The memory 210 may also store data blocks generated by the multi-SIM device 202 for future processing.

In an embodiment, the network entity 212 refers to any entity that performs one or more functionalities of a network connection between the multi-SIM device 202 and the base station 214 and/or the Wi-Fi network 216. Further, the network connection may be established between the multi-SIM device 202 and the base station 214 and/or the Wi-Fi network 216 via a communication port or interface or using a bus. The communication port may be configured to connect with a network, external media, memory, or any other components in a system, or combinations thereof. The network connection may be a physical connection, such as a wired Ethernet connection, or may be established wirelessly. Likewise, the additional connections with other components of the system 200 may be physical or may be established wirelessly. The network may alternatively be directly connected to the bus.

In an embodiment, the base station 214 is a fixed communication station that is part of a network's wireless telephone system. The base station 214 is configured to relay information to and from the multi-SIM device 202 via the network entity 212. The base station 214 allows the multi-SIM device 202 to get access to the network within a frequency coverage area of the base station 214. The base station 214 is generally a transceiver, capable of sending and receiving wireless signals to and from other devices. A communication medium may be considered as a cellular connection when the multi-SIM device 202 communicates with the base station 214 via the network entity 212.

In an embodiment, the Wi-Fi network 216 is a wireless network protocol based on the IEEE 802.11 family of standards. The Wi-Fi network 216 is a local area network by which computers or mobile devices can access data. The Wi-Fi network 216 is configured to relay information to and from the multi-SIM device 202 via the network entity 212 over radio frequency technology. For transmitting a Wi-Fi signal, a wireless router may be necessitated. The wireless router receives a wired Ethernet connection and converts the wired connection into a wireless connection. Further, the accessing device, such as a computer, a mobile device, etc. includes a Wi-Fi modem/antenna for connecting with the wireless connection for surfing data or the internet. A communication medium may be considered as the IMS based connection when the multi-SIM device 202 establishes the VoWiFi connection with the Wi-Fi network 216 via the network entity 212.

In an exemplary embodiment, the multi-SIM device 202 may also be referred to as the DSDS device 202 interchangeably throughout the disclosure without deviating from the scope of the present disclosure. The DSDS device 202 includes two SIMs, i.e., SIM1 and SIM2, and the single RFIC 204. SIM1 and SIM2 may simultaneously or substantially at the same time request paging to the RFIC 204 for communication with the network entity 212 via the RF resource 206 of the RFIC 204. However, the processor 208 may allocate the RF resource 206 to either SIM1 or SIM2 based on the priority of the paging request from each of the SIMs. For example, the processor 208 may allocate the RF resource 206 to SIM1 based on the high-priority paging request received by the RF resource 206, such as making a voice call via SIM1.

Further, the processor 208 of the DSDS device 202 is configured to perform a set of operations to share the RF resource 206 between SIM1 and SIM2. The RFIC 204 may be configured to receive simultaneous paging requests from SIM1 and SIM2 for performing communication with the network entity 212 via the RF resource 206. The processor 208 is configured to detect a page sharing conflict between the paging requests from SIM1 and SIM2 if two paging requests are received simultaneously or substantially at the same time by the RF resource 206.

Upon detecting the page sharing conflict, the processor 208 is further configured to determine a connection status between each of SIM1 and SIM2 with either the base station 214 or the Wi-Fi network 216 via the network entity 212. The connection status indicates a communication medium via which SIM1 or SIM2 is connected to the network. The communication medium corresponds to the cellular connection if SIM1 or SIM2 is connected to the base station 214 via the network entity 212. The communication medium corresponds to the IMS based connection if SIM1 or SIM2 is connected to the Wi-Fi network 216 via the network entity 212.

Based on the determined connection status, the processor 208 is further configured to prioritize a grant of the RF resource 206 to SIM1 or SIM2. The connection status of the SIM may indicate the cellular connection as the communication medium. The cellular connection may indicate that the SIM is connected to the base station 214 via the network entity 212. Thus, the processor 208 is configured to prioritize granting the RF resource 206 to the SIM communicated via the cellular connection since the other SIM may receive MT service from the Wi-Fi network 216 via the IMS connection through the Wi-Fi antenna.

In another exemplary embodiment, for determining the connection status, the processor 208 is configured to determine whether each of SIM1 and SIM2 is connected to the network entity via the cellular connection. If both of the SIMs are connected via the cellular connection, the processor 208 is further configured to retrieve information associated with the registered Wi-Fi connections with the DSDS device 202.

Thereafter, the processor 208 is configured to establish a Wi-Fi connection with the Wi-Fi network 216 based on pre-determined conditions for facilitating the IMS based connection via the VoWiFi. The pre-determined conditions include whether the DSDS device 202 is within a network coverage of any of the registered Wi-Fi connections and signal strength of the Wi-Fi connection is more than a threshold value. The threshold value of the Wi-Fi signal strength may be considered as −60 decibels per milliwatt (dBm). Therefore, the processor 208 is configured to trigger the Wi-Fi connection such that one SIM is only connected with the cellular connection and the other SIM, which is connected via cellular connection as well as Wi-Fi connection, may facilitate the IMS based connection via the VoWiFi technology.

Therefore, during the prioritization, the processor 208 of the DSDS device 202 grants the RF resource 206 to the SIM that is connected via the cellular connection. Hence, both SIM1 and SIM2 are enabled to receive MT services from the network. One SIM receives the MT service from the network via the cellular connection and the other SIM receives the MT service from the network via the IMS based connection.

In yet another exemplary embodiment, for determining the connection status, the processor 208 is configured to determine whether a quality of service (QoS) of the IMS based connection is affected due to low signal strength of the Wi-Fi connection. If the QoS is affected, the service rendered by the IMS based connection is degraded. The processor 208 is further configured to disconnect the Wi-Fi connection of the multi-SIM device 202 if the determined QoS is affected. Once the Wi-Fi connection is disconnected, both SIM1 and SIM2 of the DSDS device 202 are connected to the base station 214 via the network entity 212. The communication medium for the DSDS device 202 corresponds to the cellular connection when DSDS device 202 is connected with the base station 214 via the network entity 212. The processor 208 is further configured to schedule a grant of the RF resource to each of SIM1 and SIM2 connected to the network via the cellular connection in a round-robin schedule. In a non-limiting example, the RF resource 206 of the DSDS device 202 may be granted 20 milliseconds (ms) to each of SIM1 and SIM2 in a round-robin schedule for communicating with the network entity 212.

In an embodiment, the processor 208 is configured to check the receiving of at least two paging requests based on a DRX mode. The DRX mode includes an idle mode and a periodic wake-up mode to reduce the power consumption of the multi-SIM device 202. During the page conflicts between two paging requests, the processor is configured to prioritize the RF resource 206 to the SIM that is connected via the cellular connection only. Therefore, in the DRX mode during this timeframe, the RF resource performs checking of receiving paging request from the prioritized SIM for cellular connection only.

FIG. 3 illustrates a flow chart of a method for sharing the RF resource among multi-SIM stacks, in accordance with an embodiment of the present disclosure. FIG. 3 illustrates the method 300 for sharing the RF resource among the multi-SIM stacks of the multi-SIM device 202. The method initializes its execution from the start block of FIG. 3.

In operation 302, the method 300 includes simultaneously or substantially at the same time receiving at least two paging requests from the multi-SIM stacks for performing communication with the network entity 212 via the RF resource 206. Each of the at least two paging requests corresponds to any one of a voice calling request, a video calling request, a video streaming request, a file downloading request, a file uploading request, a data transfer request, and the like. The at least two paging requests are simultaneously or substantially at the same time received by the RFIC 204 of the multi-SIM device 202 from at least two SIMs among SIM1, SIM2, . . . , SIM N. Although the RFIC 204 receives the at least two paging requests at the same time, however, only one of the at least two paging requests is permissible to communicate with the network entity 212 due to the presence of the single RF resource 206 in the multi-SIM device 202. The flow of the method now proceeds to operation 304.

In operation 304, the method 300 includes detecting a page sharing conflict between the paging requests of the multi-SIM stacks while transmitting the at least two received requests to the network entity 212 via the single RF resource 206. In a non-limiting example, a user initiates a voice call through SIM1 of DSDS device 202. Thus, a paging request is received by the RFIC 204 for the voice call from SIM1 of the DSDS device 202. In parallel, the user initiates a file uploading request via SIM2 of the DSDS device 202. Hence, another paging request is received by the RFIC 204 from SIM2 corresponding to the file uploading request. Upon receiving the two paging requests, the conflict between two paging requests is detected for communicating with the network entity 212 via the single RF resource 206. The flow of the method now proceeds to operation 306.

In operation 306, the method 300 includes determining a connection status of a connection between each stack of SIM of the multi-SIM stacks and the network entity 212, if the page sharing conflict between the paging requests from at least two SIMs is detected. The connection status of each SIM of the multi-SIM stacks is determined to resolve the page sharing conflict between the simultaneous paging requests. The connection status indicates a communication medium by which each stack of the multi-SIM device 202 is connected to the network entity 212. The communication medium corresponds to one of the cellular connection or the IMS based connection. The cellular connection relates to the communication of the multi-SIM device 202 with the base station 214 via the network entity 212.

Alternatively, the IMS based connection relates to the communication of the multi-SIM device 202 with the Wi-Fi network 216 via the network entity 212. The IMS based connection is established based on the VoWiFi technique from a data connection received from the Wi-Fi network 216. In a non-limiting example, in continuation of the example disclosed in operation 304, the connection status is determined for each of SIM1 and SIM2. The connection status may be the cellular connection or the IMS based connection. The cellular connection indicates the communication between the DSDS device 202 and the base station 214 via the network entity 212. Alternatively, the IMS based connection indicates the communication between the DSDS device 202 with the Wi-Fi network 216 via the network entity 212. The flow of the method now proceeds to operation 308.

In operation 308, the method 300 includes prioritizing a grant of the RF resource 206 to a stack of the multi-SIM stacks. A connection status of the stack may indicate a cellular connection as a communication medium. The grant of the RF resource 206 is prioritized to the stack (the SIM) that is connected via the cellular connection only. Therefore, the prioritized SIM receives an MT service from the base station 214 through the RF resource 206. Alternatively, the non-prioritized SIM, which may be connected via the IMS based connection along with the cellular connection, may receive the MT service from the Wi-Fi network 216 via the VoWiFi technology.

In one embodiment, the operations 304 through 308 and other operations disclosed herein may be performed by the processor 208 of the multi-SIM device 202.

Figure 4:
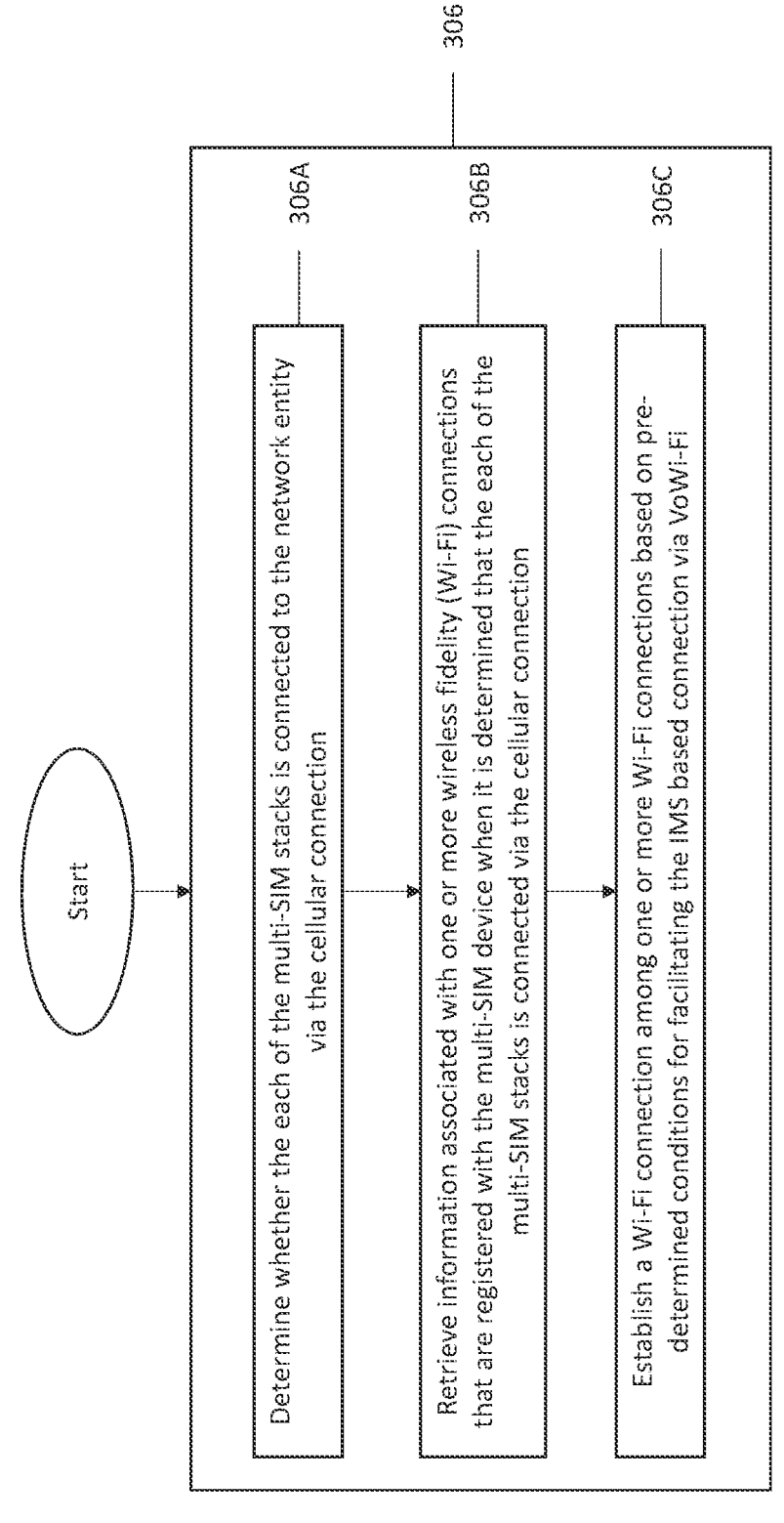
FIG. 4 illustrates a first flow chart of subsequent operations of operation 306 of FIG. 3, in accordance with an embodiment of the present disclosure.

FIG. 4 illustrates a first flow chart of subsequent operations of operation 306 of FIG. 3, in accordance with an embodiment of the present disclosure.

FIG. 4 discloses detailed operations for determining the connection status of the connection between each stack of the multi-SIM stacks and the network entity. The method initializes its execution from the start block of FIG. 4.

In operation 306A, the method includes determining whether each of the multi-SIM stacks is connected with the network entity via the cellular connection only. Based on the page sharing conflict between the at least two paging requests, the connection status of each of the multi-SIM stacks is detected, whether each of the multi-SIM is connected via the cellular connection only. The flow of the method now proceeds to operation 306B.

In operation 306B, the method includes retrieving information associated with one or more Wi-Fi connections registered with the multi-SIM device 202. If each of the multi-SIM stacks is connected via the cellular connection only, the registered one or more Wi-Fi connections are retrieved to trigger a parallel connection to resolve the page sharing conflict. In a non-limiting example, the DSDS device 202 may register to a plurality of Wi-Fi connections for connecting with the Wi-Fi network 216. If each of SIM1 and SIM2 is connected via the cellular connection only, the plurality of registered Wi-Fi connections is retrieved. The flow of the method now proceeds to operation 306C.

In operation 306C, the method includes establishing a Wi-Fi connection among one or more registered Wi-Fi connections based on pre-determined conditions for facilitating the IMS based connection via the VoWiFi. The method includes triggering an IMS based connection through the VoWiFi for at least one SIM. The other SIM may be connected with the cellular connection only.

The pre-determined conditions include whether the multi-SIM device 202 is within a network coverage of any of the registered Wi-Fi connections and signal strength of any of the Wi-Fi connections is more than a threshold value. In a non-limiting example, the method includes establishing the Wi-Fi connection if the DSDS device 202 is within the network coverage of any of the registered Wi-Fi connections and the signal strength of any of the registered Wi-Fi connections is greater than the threshold value. After the Wi-Fi connection is established, SIM1 of the DSDS device 202 may be connected via the IMS based connection with the network entity 212 along with the cellular connection. SIM2 may be still connected via the cellular connection only. Therefore, in one embodiment, the method prioritizes SIM2 to the RF resource 206 as SIM2 is connected via the cellular connection. On contrary, SIM1 may receive the MT services via the IMS based connection.

FIG. 5 illustrates a second flow chart of subsequent operations of operation 306 of FIG. 3, in accordance with an embodiment of the present disclosure.

In operation 306P, the method includes determining whether the QoS of the IMS based connection is affected due to low signal strength of the Wi-Fi connection. The communication quality or the QoS may be affected if the signal strength of the Wi-Fi connection is low. Therefore, the method includes determining the QoS of the IMS based connection based on the present signal strength.

In operation 306Q, the method includes disconnecting the Wi-Fi connection of the multi-SIM device 202 if the determined QoS is affected. Thus, the IMS based connection of the multi-SIM device 202 is discontinued if the QoS is not met for the service rendered. Therefore, each stack of the multi-SIM stacks is now connected via the cellular connection only with the base station 214.

In operation 306R, the method includes scheduling a grant of the RF resource 206 to each stack of the multi-SIM stacks connected to the network entity 212 via the cellular connection in a round-robin schedule. Therefore, the RF resource 206 is granted to each stack of the multi-SIM stacks in the round-robin schedule. Thus, each stack of the multi-SIM stacks receives the MT notification in the round-robin schedule from the network via the cellular connection only. In a non-limiting example, in the round-robin schedule, from timestamp T=0 ms to T=20 ms, the RF resource 206 is granted to SIM1 for communication with the network via the cellular connection. Further, from T=21 ms to T=40 ms, the RF resource 206 is granted to SIM2 for communication with the network via the cellular connection.

Figure 6:
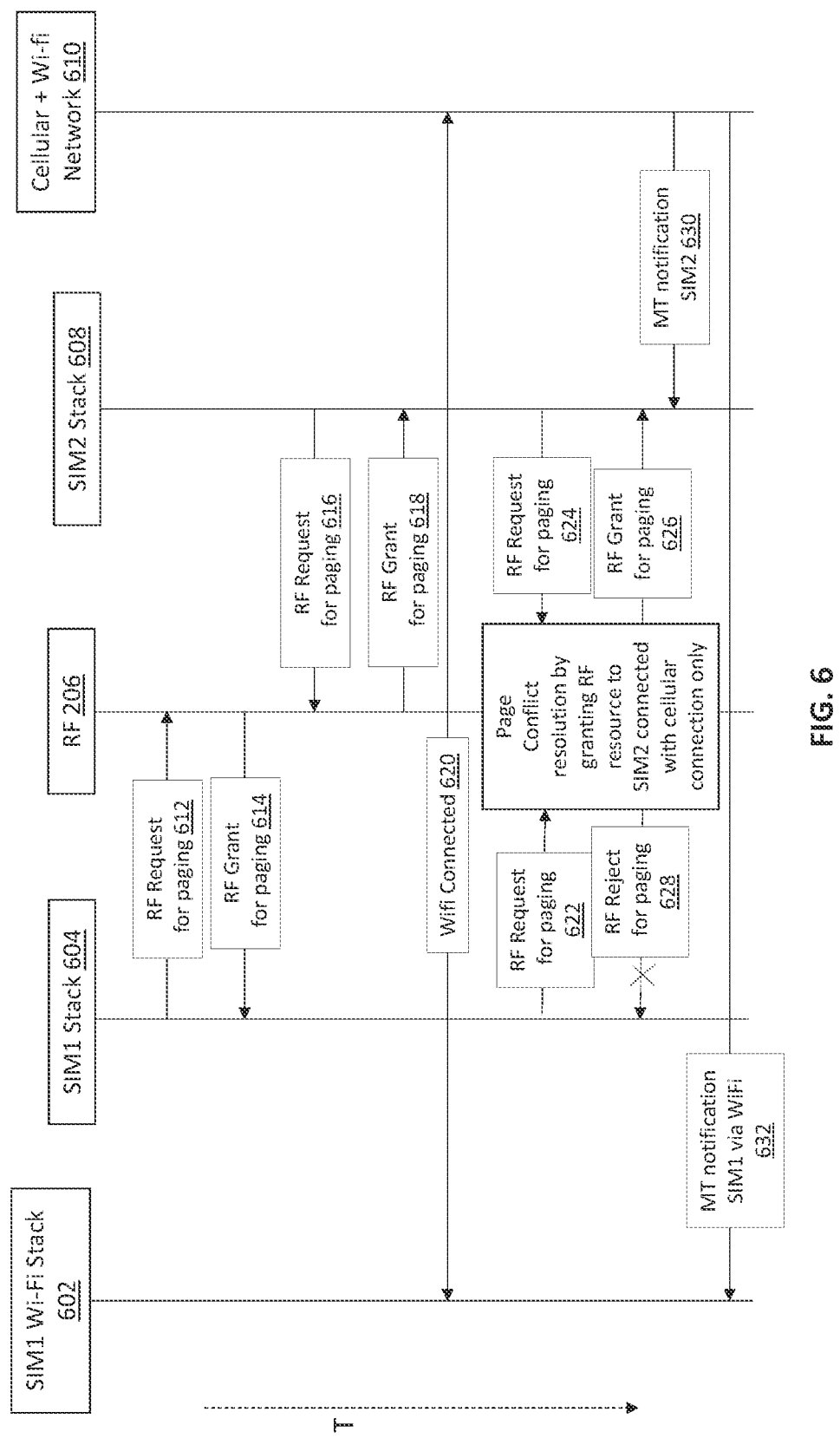
FIG. 6 illustrates an exemplary line diagram of the subsequent operations of sharing the RF resource among the multi-SIM stacks, in accordance with an embodiment of the present disclosure.

FIG. 6 illustrates an exemplary line diagram of the subsequent operations of sharing the RF resource among multi-SIM stacks, in accordance with an embodiment of the present disclosure. In a non-limiting example, FIG. 6 illustrates the sharing of the RF resource 206 of the multi-SIM device 202. The multi-SIM device 202 may include a SIM1 stack 604 and a SIM2 stack 608. The line diagram is shown in an increasing timeframe, T.

In operation 612, a paging request for the RF resource 206 may be received from SIM1 stack 604 for communicating with the network.

In operation 614, based on the paging request, the RF resource 206 may be granted to SIM1 stack 604 for communicating with the network via the cellular connection. For example, the user may initiate a voice call via SIM1 stack 604. Thus, the RF resource 206 may be granted to SIM1 stack 604 for facilitating the voice call over SIM1 stack 604 through the cellular connection.

In operation 616 and operation 618, similarly, the RF resource 206 may be granted to SIM2 stack 608 for communication with the network via the cellular connection. Subsequently, the multi-SIM device 202 may be shifted within the network coverage of the Wi-Fi network.

In operation 620, thus, a SIM1 Wi-Fi stack 602 may be connected to the Wi-Fi network. SIM1 of the multi-SIM device 202 may be now connected with the cellular connection and the IMS based connection via the VoWiFi. However, the IMS based connection has higher priority to receive a MT notification from the Wi-Fi network over the cellular connection.

In operation 622, the RF resource 206 may receive a page request from SIM1 stack 604 for communication with the network.

In operation 624, in the same timeframe, the RF resource 206 may receive a page request from SIM2 stack 608 for communication with the network. Therefore, a page sharing conflict may be detected in the RF resource 206 between the simultaneous paging requests from SIM1 stack 604 and SIM2 stack 608.

In operation 626, the RF resource 206 may be granted to SIM2 stack 608 for serving the paging requests as SIM2 stack 608 is connected via the cellular connection only.

In operation 628, on the contrary, the RF resource 206 may not be granted to SIM1 stack 604 as SIM1 stack 604 may additionally be connected via the IMS based connection.

In operation 630, subsequently, the MT notification may be received by SIM2 stack 608 from a network 610 through the cellular connection via the RF resource 206.

In operation 632, alternatively, the MT notification may be received by SIM1 stack 604 from the network 610 through IMS based connection via VoWiFi. Therefore, the multi-SIM device 202 may be enabled to receive MT notifications in both of the SIMs. For example, the user may be able to perform a voice call via SIM2 stack 608 through the cellular connection. At the same time, the user may be able to surf the internet via SIM1 stack 604 through IMS based connection.

Referring now to the technical abilities and effectiveness of the method and the system disclosed herein. The following technical advantages over the related art are provided such as playing an important role in sharing the radio frequency resource among the multi-SIM stacks of the multi-SIM device. Thus, the present disclosure improves the quality of communication by prioritizing the radio frequency resource to at least one SIM based on the connection status. Due to the prioritization of the RF resource based on the connection status, the single RF resource can be utilized efficiently when more than one paging requests are received simultaneously or substantially at the same time. Also, the present disclosure ensures receiving MT services in each of the SIMs from either the cellular connection or the Wi-Fi connection. In addition, in the DRX mode, at the time of page-page conflict between multi-SIM stacks, the present disclosure ensures saving power consumption of the device by prioritizing the at least one SIM to the RF resource.

While specific language has been used to describe the disclosure, any limitations arising on account of the same are not intended. As would be apparent to a person in the art, various working modifications may be made to the method in order to implement the disclosure as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for sharing a radio frequency (RF) resource among multi-subscriber identification module (SIM) stacks in a multi-SIM device, comprising:
   simultaneously receiving, at the same time or substantially at the same time, two paging requests from the multi-SIM stacks for performing communication with a network entity via the RF resource;
   transmitting the simultaneously received two paging requests to the network entity via the RF resource;
   detecting a page sharing conflict in the RF resource between the simultaneously received two paging requests of the multi-SIM stacks;
   determining, based on the detection of the page sharing conflict, a connection status of a connection between each stack of the multi-SIM stacks and the network entity, wherein the connection status indicates a communication medium via which each stack of the multi-SIM stacks is connected with the network entity;
   prioritizing, based on the determined connection status, a grant of the RF resource to a stack of the multi-SIM stacks wherein the connection status of the stack of the multi-SIM stacks indicates a cellular connection as the communication medium; and
   granting the RF resource to a first stack of the multi-SIM stacks which is connected to the cellular connection only among the first stack and a second stack of the multi-SIM stacks which is connected to a Wi-Fi connection, based on the determined connection status of the connection.

2. The method of claim 1, wherein the communication medium corresponds to one of the cellular connection or an IP Multimedia Subsystem (IMS) based connection that is established based on a voice over wireless fidelity (VoWiFi).

3. The method of claim 2, wherein the determining of the connection status of the connection further comprising:
   determining whether each stack of the multi-SIM stacks is connected to the network entity via the cellular connection;
   retrieving information associated with one or more Wi-Fi connections that are registered with the multi-SIM device based on a determination that each stack of the multi-SIM stacks is connected via the cellular connection; and
   establishing, based on the retrieved information, a Wi-Fi connection among one or more Wi-Fi connections based on a pre-determined condition for facilitating the IMS based connection via the VoWiFi.

4. The method of claim 3, wherein the pre-determined condition comprises whether the multi-SIM device is within a network coverage of the Wi-Fi connection and a signal strength of the Wi-Fi connection is higher than a threshold value.

5. The method of claim 3, wherein the determining of the connection status of the connection further comprising:
   determining whether a quality of service (QoS) of the IMS based connection is affected due to a low signal strength of the Wi-Fi connection;
   disconnecting the Wi-Fi connection of the multi-SIM device based on a determination that the QoS is affected; and
   scheduling the grant of the RF resource to each stack of the multi-SIM stacks connected to the network entity via the cellular connection in a round-robin schedule.

6. The method of claim 1, wherein the receiving the two paging requests is checked based on a discontinuous reception (DRX) mode, wherein the DRX mode comprises an idle mode and a periodic wake-up mode to reduce power consumption of the multi-SIM device.

7. The method of claim 1, wherein each of the two paging requests for performing communication includes any one of a voice calling request, a video calling request, a video streaming request, a file downloading request, or a file uploading request.

8. A system for sharing a radio frequency (RF) resource among multi-subscriber identification module (SIM) stacks in a multi-SIM device, the system comprising:
   one or more memory units;
   a radio frequency integrated circuit (RFIC) configured to simultaneously receive, at the same time or substantially same time, paging requests from the multi-SIM stacks for performing communication with a network entity via the RF resource; and
   a processor communicatively coupled with the RFIC and the one or more memory units, wherein the processor is configured to:
   transmit two paging requests received by the RFIC to the network entity via the RF resource;
   detect a page sharing conflict in the RF resource between the simultaneously received paging requests of the multi-SIM stacks;
   determine, based on the detection of the page sharing conflict, a connection status of a connection between each stack of the multi-SIM stacks and the network entity, wherein the connection status indicates a communication medium via which each stack of the multi-SIM stacks is connected with the network entity;
   prioritize, based on the determined connection status, a grant of the RF resource to a stack of the multi-SIM stacks wherein the connection status of the stack of the multi-SIM stacks indicates a cellular connection as the communication medium; and grant the RF resource to a first stack of the multi-SIM stacks which is connected to the cellular connection only among the first stack and a second stack of the multi-SIM stacks which is connected to a Wi-Fi connection, based on the determined connection status of the connection.

9. The system of claim 8, wherein the communication medium corresponds to one of the cellular connection or an IP Multimedia Subsystem (IMS) based connection that is established based on a voice over wireless fidelity (VoWiFi).

10. The system of claim 9, wherein to determine the connection status of the connection, the processor is further configured to:

determine whether each stack of the multi-SIM stacks is connected to the network entity via the cellular connection;

retrieve information associated with one or more Wi-Fi connections that are registered with the multi-SIM device based on a determination that each stack of the multi-SIM stacks is connected via the cellular connection; and establish, based on the retrieved information, a Wi-Fi connection among one or more Wi-Fi connections based on a pre-determined condition for facilitating the IMS based connection via the VoWiFi.

11. The system of claim 10, wherein the pre-determined condition comprises whether the multi-SIM device is within a network coverage of the Wi-Fi connection and signal strength of the Wi-Fi connection is higher than a threshold value.

12. The system of claim 11, wherein to determine the connection status of the connection, the processor is further configured to:

determine whether a quality of service (QoS) of the IMS based connection is affected due to low signal strength of the Wi-Fi connection;

disconnect the Wi-Fi connection of the multi-SIM device based on a determination that the QoS is affected; and schedule the grant of the RF resource to each stack of the multi-SIM stacks connected to the network entity via the cellular connection in a round-robin schedule.

* * * * *